March 8, 1955

C. F. BISHOP 2,703,706

PORTABLE DEHYDRATOR

Filed May 3, 1951

INVENTOR.
Charles F. Bishop
BY
Wayland D Keith
HIS AGENT

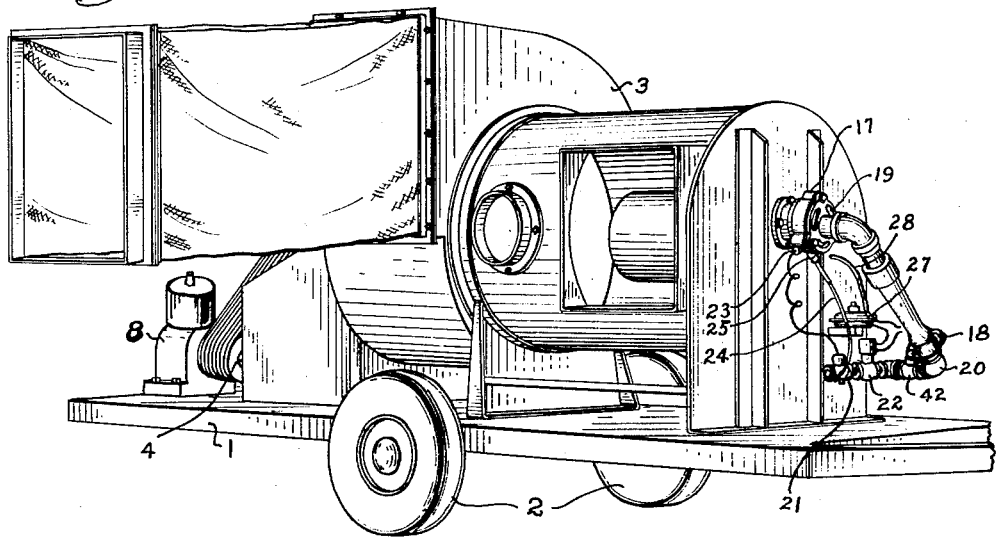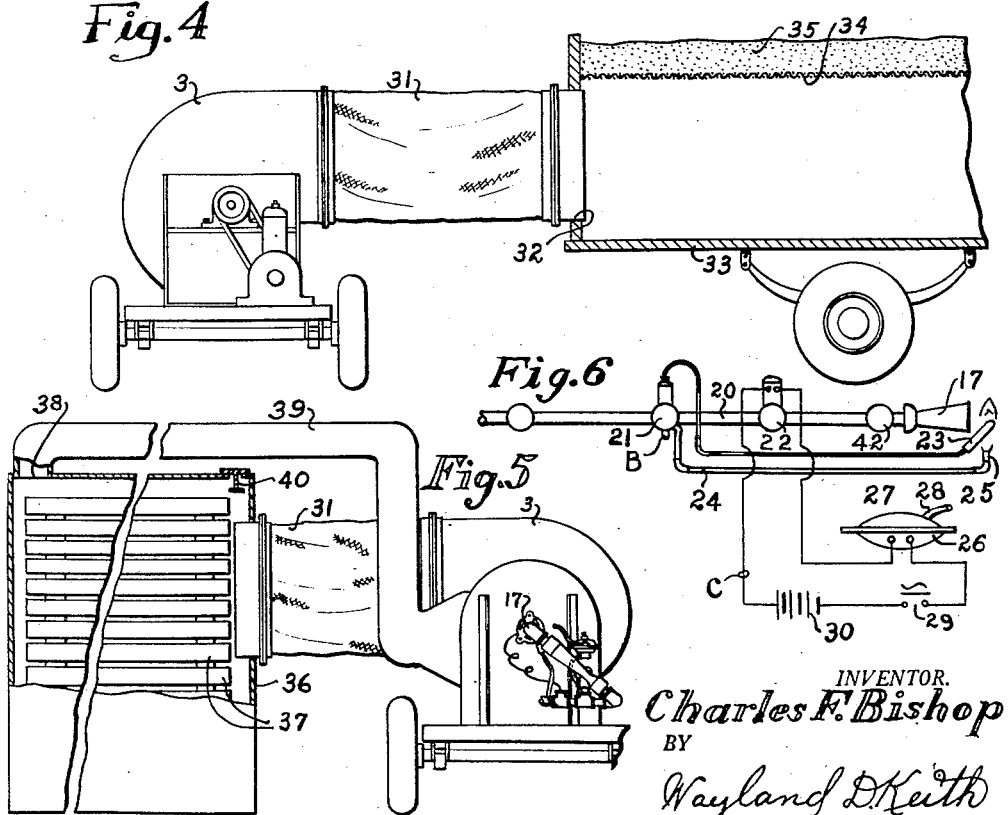

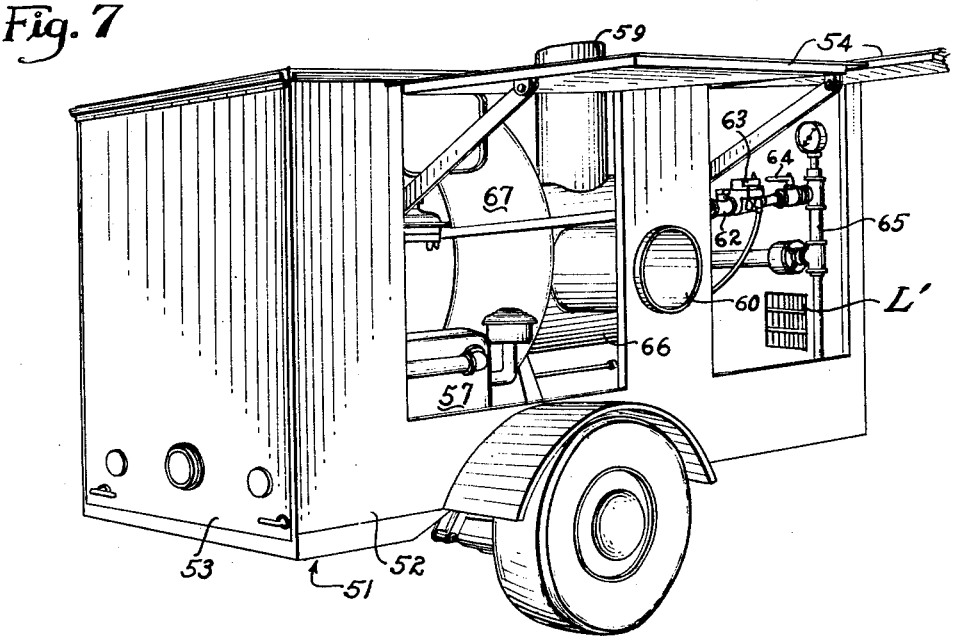
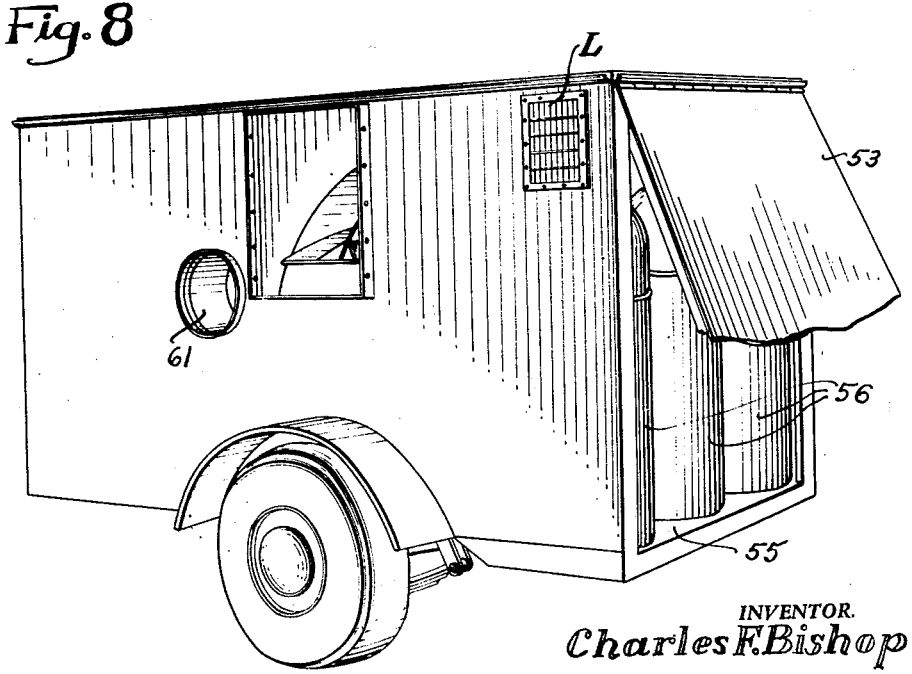

ly of drive belts 11 in the proper

United States Patent Office 2,703,706
Patented Mar. 8, 1955

2,703,706
PORTABLE DEHYDRATOR
Charles F. Bishop, Dallas, Tex.

Application May 3, 1951, Serial No. 224,269

5 Claims. (Cl. 263—19)

This invention relates to improvements in portable dehydrators or dryers and more particularly to portable dryers used in drying vegetable matter such as seed crops, hay and the like, for drying fertilizer, lumber, potatoes, fruits and other products to relieve them of moisture content. The device may also be used in drying moisture from basements, building construction, for the curing of concrete and for maintaining certain machinery and equipment at an operable temperature during adverse weather conditions.

The present dryer is of the hot air type and is so designed as to give the maximum discharge of the hot air from the smallest possible amount of equipment.

Various dryers have been proposed heretofore, but these, for the most part have been cumbersome in construction and operation, inefficient, and not applicable to such a wide variety of uses as is the present dryer.

An object of this invention is to provide a dryer and heating unit that is compact, efficient and that may be easily moved from place to place for performing the heating and drying operation.

Another object of this invention is to provide a dryer and heating unit that is effective in reducing the moisture content of the material being dried, that is economical in use, and which may be readily adapted to diverse uses without mechanical changes.

Another object of this invention is to provide crop drying apparatus that can be readily controlled, give cleaner results and at the lowest possible cost.

Yet another object of this invention is to provide a crop drying apparatus that can be used when the crop is at the proper stage, regardless of the weather conditions.

A still further object of this invention is to provide a drying apparatus that is automatic in operation and that has safety and temperature controls.

An embodiment of this invention is illustrated in the accompanying drawings in which:

Fig. 3 is a perspective view of the invention showing an end and a side thereof, and as mounted on a trailer;

Fig. 4 is an end view showing the invention as mounted on a trailer, and with the hot air discharge duct thereof interconnected with a drying frame that is mounted on a vehicle, but with the outside wall of the vehicle removed, parts shown in section and broken away to bring out the details of construction, and showing material to be dried positioned on said frame;

Fig. 5 shows the invention attached to a kiln, such as is used for drying lumber and the like, with an end of the invention shown; showing the re-circulation ducts connected thereto, and with parts of the kiln broken away and shortened and shown in section;

Fig. 6 is a diagrammatic view of thermal and electrical control systems;

Fig. 7 is a perspective view of a modified form of the invention showing it housed within a trailer, but with the sides to the trailer raised to illustrate the details of construction; and Fig. 8 is a view similar to Fig. 7, but of the opposite side of the trailer and showing an end door raised and a portion thereof broken away.

Figures 1, 2:
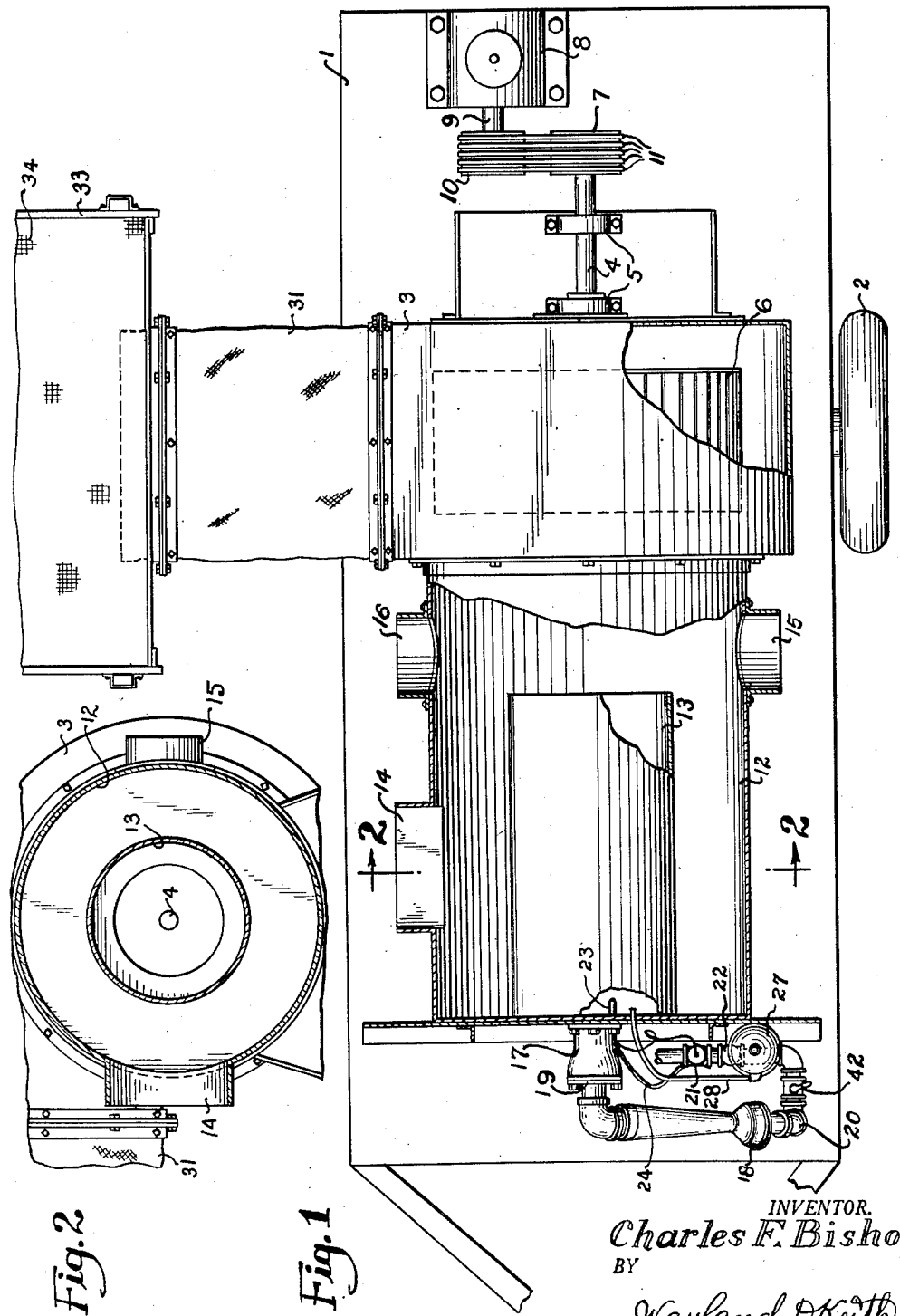
Fig. 1 is a top plan view of the invention mounted on a trailer, with parts broken away and shown in section to illustrate the details of construction.
Fig. 2 is a sectional view taken on the line 2—2 of Fig. 1, looking in the direction indicated by the arrows.

With more detailed reference to the drawing, the numeral 1 designates a trailer mounted on wheels 2, which trailer is of a type suitable to be drawn behind a truck or other traction vehicle. A blower fan 3, which is of the conventional type, is mounted on the trailer 1 and has a shaft 4 mounted on bearings 5 which carry a fan blade member 6 at the inner end and a pulley 7 at the outer end.

A power unit 8 is also mounted on the trailer and has a drive shaft 9 extending outward therefrom on which a drive pulley 10 is mounted. The pulley 10 is belted to the pulley 7 by a plurality of drive belts 11 in the proper ratio to drive fan blades 6 at the desired speed.

Secured to the blower fan 3, on the side opposite the power unit 8, is a heating chamber designated at 12 on which is positioned a combustion chamber 13. The heating chamber 12 has air inlet openings 14, 15 and 16 disposed within the walls thereof, the openings 15 and 16 being diametrically opposite each other at a point where the outlet end of the combustion chamber terminates. A larger air inlet 14 is positioned intermediate the length of the heating chamber 12 so as to direct air onto the combustion chamber 13. The combustion chamber 13 has a burner 17, which burner has a primary air inlet 18 and a secondary air inlet 19 therein, so as to insure substantially complete combustion of the fuel admitted through pipe 20 within the length of the combustion chamber 13, which combustion chamber 13 is relatively short for the amount of fuel to be used. The fuel inlet pipe 20 and the burner 17 are designed to use low pressure gas of the character of butane or propane and the like, or, if available, natural gas.

A thermal control valve 21 and a solenoid valve 22 are positioned within the low pressure gas pipe 20 to insure proper regulation of the fuel to the burner. The valve 21 is of the regulator type that has a thermal element 23 directly responsive to the flame of the burners 17 and 25. The thermal valve 21 has a gas supply pipe 24 which leads to a pilot burner 25 to provide ignition for burner 17. This valve is of well known type that requires the valve leading to the pilot burner to be manually maintained open until the burner is lighted and has burned a sufficient length of time to cause a thermal element therein to maintain the valve in open position. The thermal valve 21 is of the type that when the burner is extinguished the valve closes and will not re-open until the burner is lighted. The pilot light is supplied with fuel from the down stream side of the thermal control valve so when the valve 21, supplying the main burner closes, the main gas supply pipe and the pilot burner 25 will be extinguished to prevent fire hazard.

Positioned within the fuel supply pipe 20, intermediate the thermal control valve 21 and the burner 17, is a solenoid control valve 22, the solenoid of which is connected in series with an air flow switch 26 that is so positioned as to keep the contact points closed by the action of a suction upon a diaphragm within casing 27, which suction is created in the interior of combustion chamber 13 by the blower fan 3. A tube 28 leads from one side of the diaphragm casing 27 and is open to the interior of the combustion chamber 13 and is effected thereby.

An electro-temperature controller element 29 is positioned within the air discharge leading from the blower fan 3 to the particular material being dried, and it is so adjusted that if the air discharge is in excess of a set temperature, the contact points of the switch will open, which will cause the solenoid valve to be deenergized, thereby cutting off the gas supply to the main burner.

It is preferable to have a source of electricity, such as a battery 30, in series with a solenoid valve 22 and the air switch 26, and temperature control switch 29, so upon the opening of either the air flow switch or the temperature control switch, the gas supply to the main burner will be cut off by the solenoid valve, so as to prevent danger of fire.

Figs. 4 and 5 of the drawing are illustrative of two different uses for which the heater and dryer can be used. Fig. 4 shows the blower fan 3 with a flexible duct 31, which may be of fabric or other suitable material, connected into an opening 32 formed within an end of a closed vehicle body 33, which body has a screen top 34. The hot air from the blower fan may be forced into the closed vehicle body 33 below the screen 34, so the hot air will pass through the material 35, such as grain, which is being dried, and outward therefrom carrying the excess moisture from the material 35.

In the case of using the device for certain types of treating or drying, where heat is a factor, the hot air may be forced out through duct 31, as shown in Fig. 5, into a closed cabinet or kiln 36 in which lumber or other material 37 may be stacked. The air circulates through the kiln 36 and is normally exhausted at 38 into a return air pipe 39 back through primary air inlet 14 into the heating chamber 12 to be reheated, and again discharged from the blower fan 3 in the manner hereinbefore set out. The kiln 36 may have a relief valve 40, if the in-put air thereinto is greater than the amount of air returned through duct 39 to the primary air inlet 14. Such excess air will be allowed to escape through relief valve 40, carrying therewith such humid gases as may be contained therein.

Operation

To operate the device as shown in Figs. 1 to 6, inclusive, the power unit 8 is started, which will, in turn, drive through shaft 9, pulleys 10 and belts 11 to drive pulley 7 mounted on shaft 4, so as to rotate blades 6, which blades are secured to shaft 4. The fan blades 6 preferably have backward pitched blades, and the blower fan is known as the non-overloading type. With the blades rotating, a suction will be created within heating chamber 12 and combustion chamber 13, which in turn will exert suction on tube 28 leading to the diaphragm casing of the air flow switch, which will cause the closing of a switch 26 within circuit C.

The valve 42 within inlet pipe 20 is manually closed before the pilot burner 25 is lighted, then, by depressing the button B of thermal valve 21, gas will be directed into pipe 24 leading to pilot burner 25 to enable the lighting of the pilot burner, whereupon, the thermal elements 23 located in close proximity to the flame of the pilot burner will receive the heat reaction from the flame which will maintain the valve 21 in open position within a short time. After the pilot has heated the thermal element 23 to maintain the thermal valve 21 in open position, the button B is released, whereupon the valve 42 which supplies gas to the main burner 17, can be manually opened the desired amount.

The burner 17 is regulated for the maximum amount of heat by valve 42, however, the solenoid valve 22 is positioned in pipe 20 which is responsive to and is closed by the opening of the points of the thermal regulator 29 should the heat discharging from the hot air duct 31 become excessive. The solenoid valve is also closed by the opening of the points of suction control switch 26 operable through tube 28 by the suction exerted on the diaphragm within housing 27.

When the solenoid valve 22 is closed, the pilot burner 25 remains lighted, which maintains thermal valve 21 open, which enables the gas to be turned on in response to the suction and heat control demands; however, if the pilot light should become extinguished, the thermal element 23 will cool which will cause thermal valve 21 to close, and it will not re-open until the above procedure of lighting the pilot burner is carried out. Both the points of the air flow switch 26 and of the temperature controller 29 will close as soon as the suction and temperature drop below the predetermined setting; therefore to light the pilot burner 25, it is necessary only to depress button B and follow the procedure of lighting the burner as described above.

With the blower fan 3 in operation and discharging hot air at the desired temperature, incoming air will be drawn in through the primary air inlet 14 into the heating chamber 12, and into contact with combustion chamber 13. The air being drawn in through air inlets 18 and 19 of the burner 17 will cause intense flame to be maintained within the combustion chamber 13, and with the secondary air inlets 15 and 16 disposed diametrically opposite each other in heating chamber 12 at the discharge end of the combustion chamber 13, the flame will not be drawn into blower housing 3 to damage the fan blades 6, as the secondary air inlets 15 and 16 provide sufficient air to prevent the blaze from protruding from the end of the combustion chamber 13. The air taken in through the secondary air inlets 15 and 16, together with the air drawn in through the primary air inlet 14, will be discharged at the desired temperature, along with the products of combustion from the combustion chamber into the inlet opening of the fan housing 3.

It is to be pointed out that the combustion chamber 13 is relatively short in proportion to the amount of fuel consumed and if it were not for the air from the secondary air inlets 15 and 16 being discharged adjacent the discharge end of the combustion chamber, the combustion could not be completed in such short space to such a high temperature without danger of impingement of the flame on the fan blades 6.

The flexible duct material 31, and the material 35, which is being heated might be in danger of fire by the flame, however with the present invention, the maximum temperature is controlled by the temperature controller 29, air flow switch 26, and thermal valve 21, which presents a device of unusual safety characteristics, under all normal operating conditions.

The maximum temperature of the discharge fan is controlled by the temperature controller 29, and the minimum air suction is controlled by air flow switch 26, so upon the flame from the burner 17 heating the discharge air above a predetermined temperature, the points of the temperature controller 29 will open which will cause solenoid valve 22 to close, thus preventing the system from becoming overheated by closing off the supply of gas to the burner 17. However, if the suction on the fan drops to such an extent that the amount of air supply being handled is insufficient, the suction switch 26 will open, which will close the solenoid valve 22.

While the solenoid valve 22 has been described as the type that will close upon failure of electrical energy, it is to be pointed out that solenoid valves of the opposite type can be used, that is, a valve that will close upon the energization of the solenoid can be used equally as well, but with switches that are operated in the reverse manner from the switches and temperature controller described above.

It will be readily seen that the device is compact and that it is suitable for portable use or for permanent installation, and that the device is so regulated by automatic controls as to make it virtually impossible to create a fire hazard once the device is properly regulated.

In the drying of seeds or feeds, either loose, sacked or baled, the material to be dried is preferably placed above the screen member 34 so that hot air may be directed into a closed compartment, such as vehicle body 33, and the hot air forced out through the material to be dried in such manner as to expel the desired amount of moisture therefrom.

In the drying or heating of materials within a closed kiln 36, the material to be dried, such as lumber 37, may be loosely stacked so the air from the blower fan can be forced in through duct 31 to the kiln to find its way to an outlet opening 38 and a relief valve 40. Part of the air passing through the kiln 36 will be returned to the primary air inlet opening 14 through a duct 39. The relief valve 40 is provided to vent the excess air and to permit the escape of humidified vapors.

Modified form

A modified form of the invention is shown in Figs. 7 and 8, which form is particularly adaptable for use in extremely cold climates where fuel, such as butane or propane does not readily vaporize, but this form of the invention may be put to all the uses as set out for the form of the invention as illustrated in Figs. 1 to 6, inclusive and described above, including the recirculation of hot air.

This form of the invention comprises a vehicle which is generally designated by the numeral 51, which has side walls 52, an end door 53 and side doors 54. A compartment 55 is provided in which fuel containers 56 may be stored so as to be in close proximity to the heat generated by the power unit 57 and the heating chamber 58. The combustion chamber, within the heating chamber 58, is provided with primary air inlet 59 and opposed secondary air inlets 60 and 61, which are substantially the same as the air inlets 15 and 16, in the form of the invention described above.

The mechanical construction of the invention, as shown in Figs. 7 and 8, is substantially the same as that shown in Figs. 1 through 6, with the exception that the mechanism is so enclosed as to utilize the heat of the products of combustion from the power unit and the heating chamber 66 to furnish the heat required to produce vaporization from the liquid fuels within the containers 56.

A thermal control valve 62, similar to the valve 21 described above, is provided and a solenoid valve 63, similar to the valve 22, described above, and a manual control valve 64 which is similar to the manual control valve 42, in the above described form are positioned in the fuel supply pipe 65.

Operation of the modified form

The operation of the modified form of the invention, as illustrated in Figs. 7 and 8, is generally the same as that described for the form shown in Figs. 1 through 6, except that the mechanism is so arranged that it may be used in climates where the heat of vaporization is below the normal temperature for vaporizing the fuel utilized for heating the combustion chamber.

A compartment 55 is provided which adjacent the power unit 57 and in close proximty to the heating chamber 58 so that the fuel, such as butane or propane, contained in the containers 56 is maintained at a sufficiently high temperature for vaporization to take place, once the unit is in operation. A louvre L is provided, which louvre regulates the outlet of heated air to maintain the desired temperature for vaporization of fuel in the containers 56, by the circulation of air through compartment 55.

An air inlet louvre L' is provided in the vehicle housing to regulate the incoming air to the power unit and the burners and is of the type that may be opened or closed the degree desired to regulate the air intake.

Doors 53 and 54 are also provided and which doors may be opened to any extent desired to further control the incoming air.

It is to be understood that while the invention has been described in some detail in the preferred forms thereof, that changes may be made in the minor details of construction and adaptations made to particular uses and conditions without departing from the spirit of the invention as set forth in the appended claims.

Having thus described the invention, what is claimed is:

1. In a portable dehydrating device a frame, a blower unit having a housing, which housing has an inlet opening and an outlet opening formed therein, said blower unit being mounted on said frame, power means connected to said blower unit in driving relation, a cylindrical casing of substantially uniform diameter mounted on said frame and connected with said inlet opening of said blower housing, which cylindrical casing has a partially closed outer end, a second cylindrical casing of substantially uniform diameter and with an imperforate wall and having a partially closed outer end and open inner end, said second mentioned cylindrical casing being positoned within said first mentioned cylindrical casing and having its cylindrical wall spaced a substantial distance from the cylindrical wall of the first named cylindrical casing to provide a relatively wide annular space between the walls of the two casings and being secured to the outer end thereof and coaxial therewith and extending a substantial distance into said first named cylindrical casing, said second casing being of lesser length than said first mentioned cylindrical casing, said second cylindrical casing forming a combustion chamber, a burner fitted within an opening formed in said partially closed outer end of said second cylindrical casing and being substantially axial thereof, a primary air inlet opening formed in the side of said first mentioned cylindrical casing intermediate the length of said second cylindrical casing, and a second air inlet opening formed in the side of said first mentioned cylindrical casing and disposed immediately in front of the open inner end of said second mentioned cylindrical casing.

2. In a portable dehydrating device a frame, a blower unit having a housing, which housing has an inlet opening and an outlet opening formed therein, said blower unit being mounted on said frame, power means connected to said blower unit in driving relation, a cylindrical casing of substantially uniform diameter mounted on said frame and connected with said inlet opening of said blower housing, which cylindrical casing has a partially closed outer end, a second cylindrical casing of substantially uniform diameter and with an imperforate wall and having a partially closed outer end and open inner end, said second cylindrical casing being positioned within said first mentioned cylindrical casing and having its cylindrical wall spaced a substantial distance from the cylindrical wall of the first named cylindrical casing to provide a relatively wide annular space between the walls of the two casings and being secured to the outer end thereof and coaxial therewith and extending a substantial distance into said first named cylindrical casing, said second casing being of lesser length than said first mentioned cylindrical casing, said second cylindrical casing forming a combustion chamber, a burner fitted within an opening formed in said partially closed outer end of said second cylindrical casing and being substantially axial thereof, a primary air inlet opening formed in the side of said first mentioned cylindrical casing intermediate the length of said second cylindrical casing, and secondary air inlet openings formed in the side of said first mentioned cylindrical casing and disposed immediately in front of the open inner end of said second mentioned cylindrical casing.

3. In a portable dehydrating device a frame, a blower unit having a housing, which housing has an inlet opening and an outlet opening formed therein, said blower unit being mounted on said frame, power means connected to said blower unit in driving relation, a cylindrical casing of substantially uniform diameter mounted on said frame and connected with said inlet opening of said blower housing, which cylindrical casing has a partially closed outer end, a second cylindrical casing of substantially uniform diameter and with an imperforate wall and having a partially closed outer end and open inner end, said second mentioned cylindrical casing being positioned within said first mentioned cylindrical casing and having its cylindrical wall spaced a substantial distance from the cylindrical wall of the first named cylindrical casing to provide a relatively wide annular space between the walls of the two casings and being secured to the outer end thereof and coaxial therewith and extending a substantial distance into said first named cylindrical casing, said second casing being of lesser length than said first mentioned cylindrical casing, said second cylindrical casing forming a combustion chamber, a burner fitted within an opening formed in said partially closed outer end of said second cylindrical casing and being substantially axial thereof, a primary air inlet opening formed in the side of said first mentioned cylindrical casing intermediate the length of said second cylindrical casing, and a pair of secondary air inlet openings formed in the side of said first mentioned cylindrical casing and disposed immediately in front of the open inner end of said second mentioned cylindrical casing.

4. In a portable dehydrating device a frame, a blower unit having a housing, which housing has an inlet opening and an outlet opening formed therein, said blower unit being mounted on said frame, power means connected to said lower unit in driving relation, a cylindrical casing of substantially uniform diameter mounted on said frame and connected with said inlet opening of said blower housing, which cylindrical casing has a partially closed outer end, a second cylindrical casing of substantially uniform diameter and with an imperforate wall and having a partially closed outer end and open inner end, said second mentioned cylindrical casing being positioned within said first mentioned cylindrical casing and having its cylindrical wall spaced a substantial distance from the cylindrical wall of the first named cylindrical casing to provide a relatively wide annular space between the walls of the two casings and being secured to the outer end thereof and coaxial therewith and extending a substantial distance into said first named cylindrical casing, said second casing being of lesser length than said first mentioned cylindrical casing, said second cylindrical casing forming a combustion chamber, a burner fitted within an opening formed in said partially closed outer end of said second cylindrical casing and being substantially axial thereof, a relatively large primary air inlet opening formed in the side of said first mentioned cylindrical casing intermediate the length of said second cylindrical casing, and a pair of secondary air inlet openings formed diametrically in the side of said first mentioned cylindrical casing and disposed immediately in front of the open inner end of said second mentioned cylindrical casing, each of said secondary air inlet openings being smaller than said primary air inlet opening.

5. In a portable dehydrating device a frame, a blower unit having a housing, which housing has an inlet opening and an outlet opening formed therein, said blower unit being mounted on said frame, power means connected to said blower unit in driving relation, a horizontal, cylindrical casing of substantially uniform diameter mounted on said frame and connected with said inlet opening of said blower housing, which cylindrical casing has a partially closed outer end, a second horizontal, cylindrical casing of substantially uniform diameter and with an imperforate wall and having a partially closed outer end and open inner end, said second mentioned cylindrical casing being positioned within said first mentioned cylindrical casing and having its cylindrical wall spaced a substantial distance from the cylindrical wall of the first named cylindrical casing to provide a relatively wide annular space between the walls of the two casings and being secured to the outer end thereof and coaxial therewith and extending a substantial distance into said first named cylindrical casing, said second casing being of lesser length than said first mentioned cylindrical casing, said second cylindrical casing forming a combustion chamber, a burner fitted within an opening formed in said partially closed outer end of said second cylindrical casing and being substantially axial thereof, a primary air inlet opening formed in the side of said first mentioned cylindrical casing intermediate the length of said second cylindrical casing, and secondary air inlet openings formed in the side of said first mentioned cylindrical casing intermediate the inner end of said second cylindrical casing and said blower housing.

References Cited in the file of this patent
UNITED STATES PATENTS

| | | |
|---|---|---|
| 1,832,151 | Stein | Nov. 17, 1931 |
| 2,066,524 | Gehnrich | Jan. 5, 1937 |
| 2,113,426 | Engels | Apr. 5, 1938 |
| 2,160,633 | Young | May 30, 1939 |
| 2,164,954 | Stephens | July 4, 1939 |
| 2,171,275 | Morrison | Aug. 29, 1939 |
| 2,223,597 | Brewster | Dec. 3, 1940 |
| 2,231,445 | Grapp | Feb. 11, 1941 |
| 2,285,718 | Isaacson | June 9, 1942 |
| 2,432,525 | Kruse | Dec. 16, 1947 |
| 2,445,466 | Arnhym | July 20, 1948 |
| 2,541,332 | Campbell | Feb. 13, 1951 |